(12) United States Patent
Deng et al.

(10) Patent No.: US 6,851,870 B1
(45) Date of Patent: Feb. 8, 2005

(54) METHOD FOR MEASURING AND ASSEMBLING TRANSCEIVER OPTICAL SUB-ASSEMBLY

(75) Inventors: Jau-Jan Deng, Taipei (TW); I-Lin Chu, Taipei (TW); Guo-Zen Chen, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 0 days.

(21) Appl. No.: 10/740,677

(22) Filed: Dec. 22, 2003

(51) Int. Cl.$^7$ ............................................. G02B 2/255
(52) U.S. Cl. ..................... 385/93; 385/92; 385/88; 356/153; 356/139.05; 356/400; 356/127; 356/73.1
(58) Field of Search ..................... 385/88–93, 31, 385/901; 356/139.05, 400, 127, 73.1, 153; 438/22; 350/96.15–96.2; 600/112

(56) References Cited

U.S. PATENT DOCUMENTS

| | | | | |
|---|---|---|---|---|
| 4,749,250 A | * | 6/1988 | Carter | 385/52 |
| 5,498,230 A | * | 3/1996 | Adair | 600/112 |
| 5,631,991 A | * | 5/1997 | Cohen et al. | 385/93 |
| 5,852,697 A | * | 12/1998 | Williams et al. | 385/93 |
| 6,302,569 B1 | * | 10/2001 | Huang | 362/546 |
| 6,302,596 B1 | * | 10/2001 | Cohen et al. | 385/93 |
| 6,432,733 B1 | * | 8/2002 | Hashizume | 438/22 |
| 2002/0012506 A1 | * | 1/2002 | Iizuka et al. | 385/91 |

* cited by examiner

Primary Examiner—Frank G. Font
Assistant Examiner—Ryan Lepisto
(74) Attorney, Agent, or Firm—Troxell Law Office PLLC (57) ABSTRACT

In measuring and assembling a transceiver optical sub-assembly that includes a one-piece or two-piece housing having two opposite apertures separately for an optical fiber and a functional element to assemble thereto, and a lens located between the fiber and the functional element, an image sensor is aligned with the fiber aperture to set a focus on a fiber coupling plane in the housing, and a light spot presented on the fiber coupling plane by a laser beam emitted from the functional element through the lens, or an image of a light-emitting area or a receiving area of the functional element presented on the fiber coupling plane via the lens, is measured to adjust size and/or position thereof, so as to precisely align and fix the functional element to the housing.

21 Claims, 7 Drawing Sheets

METHOD FOR MEASURING AND ASSEMBLING TRANSCEIVER OPTICAL SUB-ASSEMBLY

FIELD OF THE INVENTION

The present invention relates to a method for measuring and assembling transceiver optical sub-assembly (OSA), in which an image sensor is aligned with a fiber aperture on a housing of the optical sub-assembly and set to focus on a fiber coupling plane in the housing, so as to detect a light spot presented on the fiber coupling plane by a laser beam emitted from a functional element through the lens, or an image of a light-emitting area or a receiving area of the functional element presented on the fiber coupling plane via the lens. By adjusting the size and position of the light spot or the image on the fiber coupling plane, the functional element is precisely aligned and then fixed in the housing. With the method, measuring procedures for the OSA are simplified and the transmission bandwidth for the optical fiber is optimized, enabling an increased rate of good yield of the finished OSA.

BACKGROUND OF THE INVENTION

Optical sub-assemblies (OSA) used in optic-electronic transmission may be divided into two types depending on the functional element assembled thereto, namely, transmitter optical sub-assemblies (TOSA) and receiver optical sub-assemblies (ROSA). TOSA is a functional element-to-fiber device and includes a functional element, which may be, for example, a semiconductor laser or a light emitting diode, so that an electrical signal may be converted into light that is coupled into the optical fiber via a lens and then transmitted via the optical fiber. On the other hand, ROSA is a fiber-to-detector device to convert light transmitted via the optical fiber into an electrical signal. The TOSA and the ROSA may be combined into a bi-directional or duplex transceiver OSA.

Figure 1:
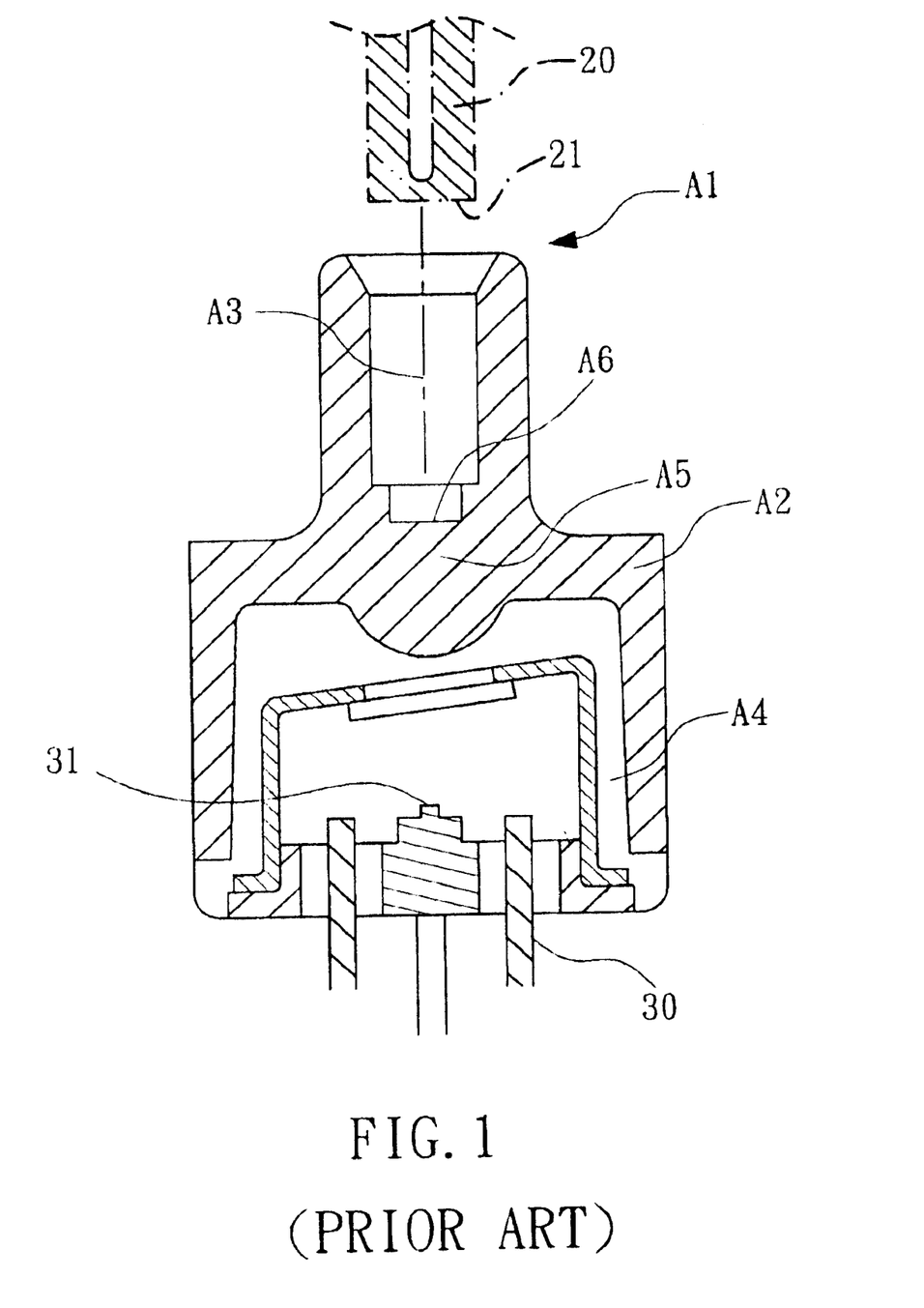
FIG. 1 is a sectional view of a conventional transceiver optical sub-assembly having a one-piece housing.

Up to date, there have been developed a variety of methods for manufacturing OSA. Among others, injection molding using transparent thermoplastic material is low-cost and becomes a main stream for manufacturing the OSA. U.S. Pat. No. 5,631,991, U.S. Pat. No. 6,432,733 B1, and U.S. Pat. No. 6,302,596 B1 (as shown in FIG. 1) are some examples of OSA made through injection molding using thermoplastic material. However, the OSA, such as the one shown in FIG. 1, which is made in the above-mentioned method, usually has the following problems during the manufacturing process:

1. Please refer to FIG. 1 in which an OSA A1 having an integrally injection-molded axially extended one-piece housing A2 is shown. The housing A2 is provided at a first end with a first aperture (fiber receptacle) A3 for an optical fiber 20 to assemble thereto, and at a second end opposite to the first end with a second aperture (LD barrel) A4 for a functional element 30 to assemble thereto. A lens A5 is provided on the housing between the first and the second aperture A3, A4. The lens A5 may be integrally formed on the housing A2, as shown in FIG. 1, or separately formed as that disclosed in U.S. Pat. No. 5,631,991 or U.S. Pat. No. 6,432,733 B1. Since it is highly difficult to make the mold for forming the housing A2, it is uneasy to control the quality of an injection-molded finished product of the housing A2. Particularly, the quality of a lens face A6 of the lens A5 of FIG. 1 has important influence on the quality of the finished product of the OSA A1. The rate of good yield of the OSA A1 is therefore low and the calibration or assembling of the OSA A1 is difficult that in turn increases the manufacturing cost of the OSA A1.

2. In a conventional method for measuring and examining the OSA A1, fiber coupling efficiency is generally based on to adjust the position of the functional element on the housing A2. In other words, the optical fiber 20 must be connected to the first aperture A3 before the functional element 30 is assembled to the housing A2. And then, a measuring instrument is used to adjust the position of the functional element 30 based on the fiber coupling efficiency. In this case, the size and position of a focal spot of a laser beam emitted from the functional element and passed through the lens A5 are adjusted according to a desired specification, and the focal spot is then coupled with an inner end of the optical fiber 20 that has already been connected to the first aperture A3, so that a finish product satisfying the required specification is obtained. Please refer to TIA/EIA-455-203 for specifications for launched power distribution measurement procedure for graded-index multi-mode fiber transmitters. Since the conventional adjustment and measurement operation adjusts the position of the functional element is based on the fiber coupling efficiency, it fails to optimize the fiber transmission bandwidth, and accordingly, could not provide effective and precise measurement to directly adversely affect the quality of the finished OSA A1.

3. The above-mentioned conventional measuring method for adjusting the position of the functional element based on the fiber coupling efficiency further includes many latent and variable factors that would affect the measurement result. For example, there is a specific tolerance for the quality of optical fibers, and the quality of the functional element is not always the same (for example, the emission power of the laser diode is not always constant and unchanged). All these factors would result in errors in the measurement of the quality of finished TOSA. For example, in the conventional measuring method, whether a finished product of OSA is qualified for use is completely decided according to the emission power of the functional element or the quality and specification of the optical fiber being used at the time of aligning the functional element. Therefore, a product may be qualified only in terms of the functional element or the optical fiber being used at the time of alignment of the functional element. In the event the initially qualified OSA product is used at a different time and/or a different place, for example, when the OSA is coupled with another optical fiber, a difference in error between the two optical fibers might result in a poor quality OSA. That is, the conventional measuring method fails to control the quality of the finished OSA to result in a low rate of good yield.

Figure 2:
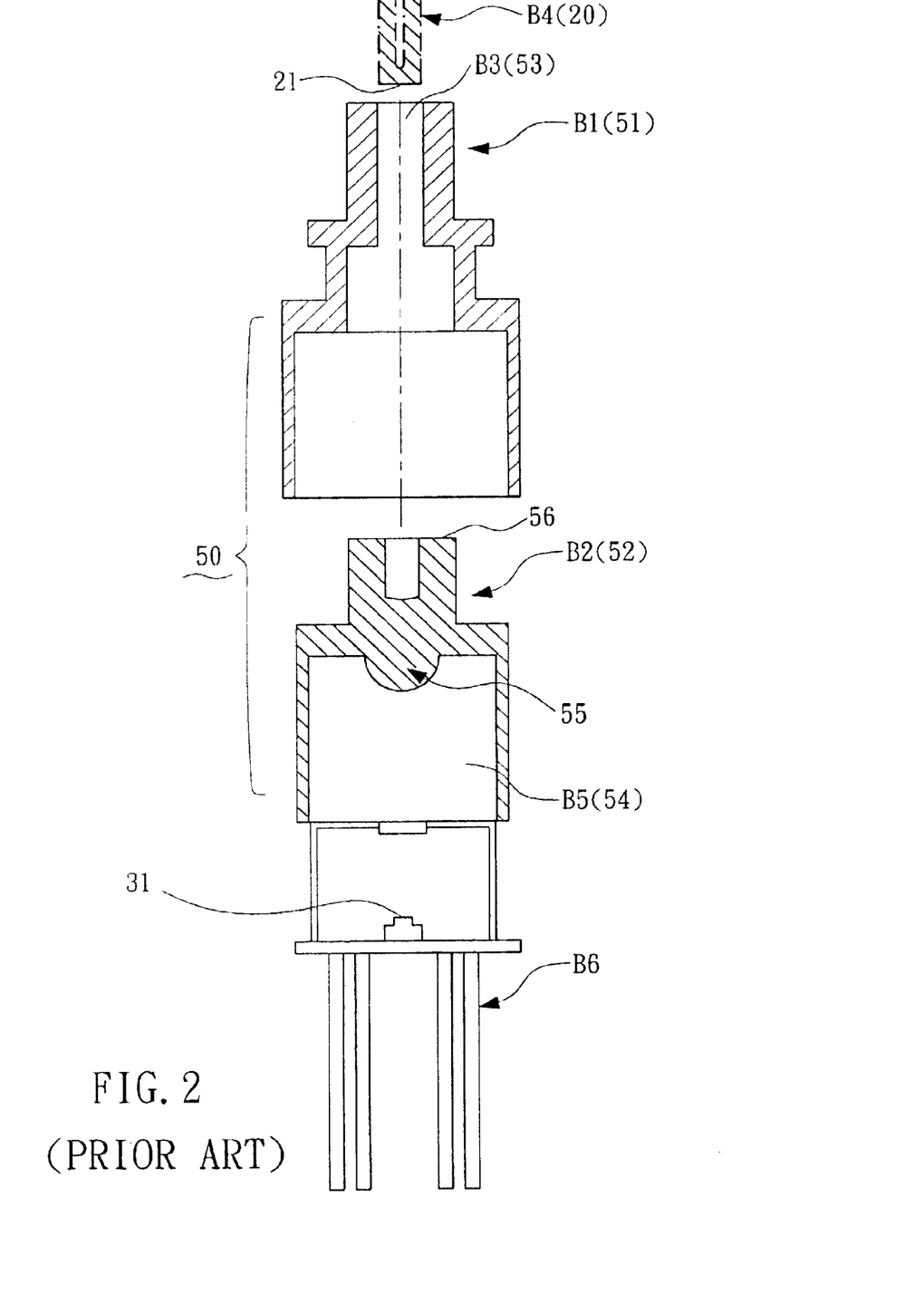
FIG. 2 is a sectional view of a transceiver optical sub-assembly having a two-piece housing.
Figure 3:
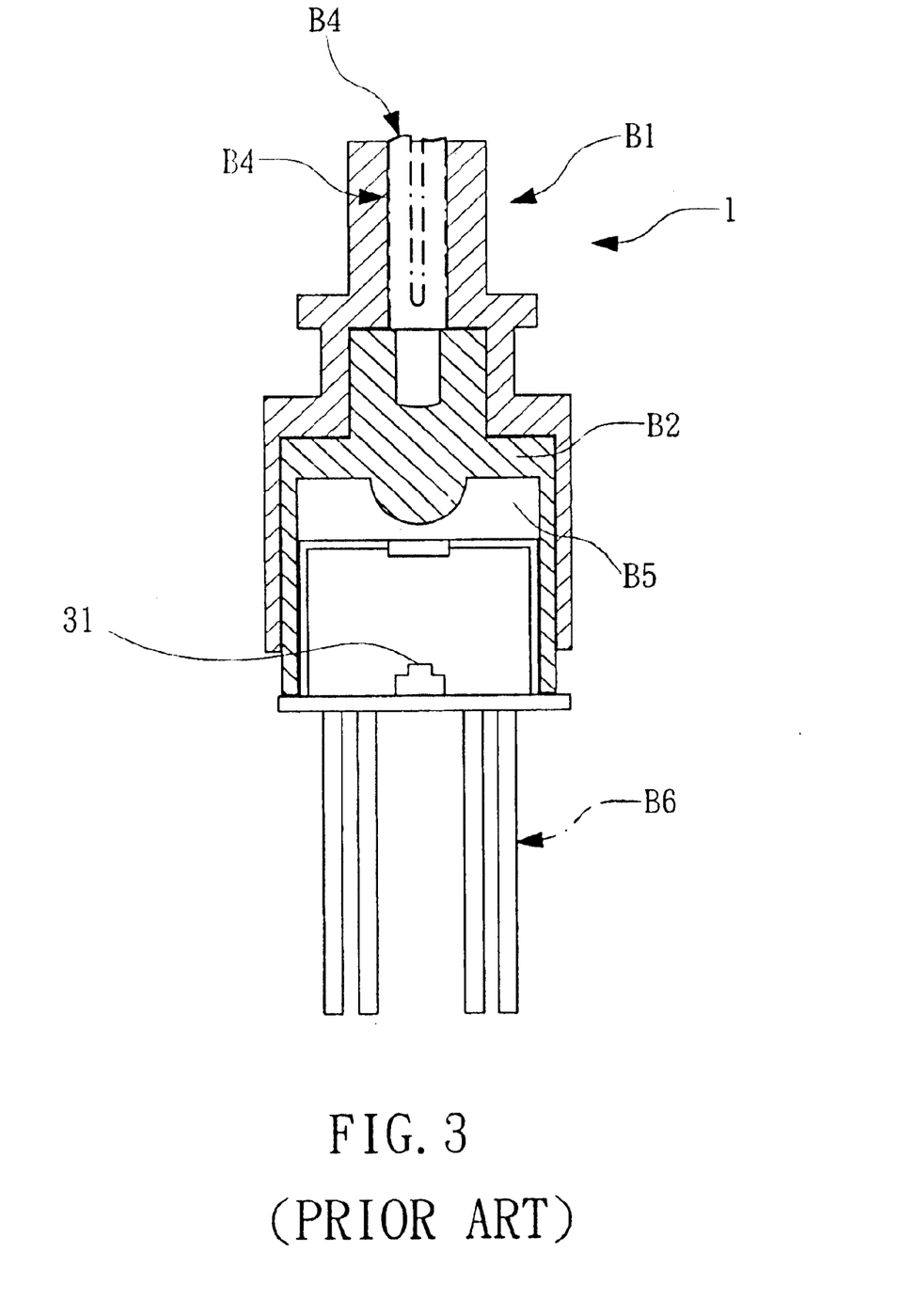
FIG. 3 is an assembled view of FIG. 2.

A two-piece housing is developed in an attempt to overcome the drawbacks existed in the integrally formed one-piece housing A2. FIGS. 2 and 3 shows a first housing B1 and a second housing B2 that are assembled together to provide a complete housing for OSA. The first housing B1 is provided at an end with an aperture B3 for an optical fiber B4 (20) to assemble thereto, and the second housing B2 is provided at an end opposite to the aperture B3 with an aperture 35 for a functional element B6 (30) to assemble thereto.

However, an OSA having a two-piece housing would still encounter the problems described in the above paragraph Nos. 2 and 3.

It is therefore desirable to develop a method for measuring and assembling a transceiver optical sub-assembly to overcome the problems existed in the conventional method for the same purpose.

SUMMARY OF THE INVENTION

A primary object of the present invention is to provide a method for measuring and assembling a transceiver optical sub-assembly, in which an image sensor is aligned with the fiber aperture on the housing of the optical sub-assembly and set to focus on the fiber coupling plane in the housing, in order to detect a light spot presented on the fiber coupling plane by a laser beam emitted from a functional element through the lens, in the case of TOSA, or an image of a light-emitting area (in the case of TOSA) or a receiving area (in the case of ROSA) of the functional element presented on the fiber coupling plane via the lens. By adjusting the size and position of the light spot or the image on the fiber coupling plane, the functional element is precisely aligned and then fixed in the housing. With the method, since the light spot or the image formed on the fiber coupling plane by the functional element is measured and corrected to ensure precise alignment of the functional element in the housing, the problems existed in the conventional method of aligning the functional element based on the fiber coupling efficiency are avoided to effectively increase the rate of good yield of finished products of OSA. The measuring procedures for the OSA are also simplified to facilitate mass-production of OSA.

Another object of the present invention is to provide a method for measuring and assembling a transceiver optical sub-assembly, in which a light spot presented on the fiber coupling plane by a laser beam emitted from the functional element through the lens, or an image of a light-emitting area or a receiving area of the functional element presented on the fiber coupling plane via the lens is directly used as an object to be measured. Therefore, the method can be used even when the OSA uses a multi-mode fiber having a coupling point that is not necessarily located at the fiber core. In other words, the method of the present invention may optimize the distribution of fiber coupling modes, reduce mode dispersion, and optimize the transmission bandwidth of the multi-mode fiber to achieve the best measurement and assembling of the OSA.

A further object of the present invention is to provide a method for measuring and assembling a transceiver optical sub-assembly; in which a light spot presented on the fiber coupling plane by a laser beam emitted from a functional element through the lens is detected in the case of TOSA, in order to proceed with the measurement for aligning the functional element in the housing of the OSA. Therefore, the method may be applied to different types of functional elements, including a vertical cavity surface emitted laser (VCSEL) and a side emitted laser. Moreover, the method may be applied to both TO-can laser diode with cap and no-cap laser diode SMT type (bare chip laser diode). And, the TOSA may be a transmitter assembly of a bi-directional or a duplex transceiver.

The method of the present invention is characterized in that an image sensor or a functionally similar instrument is aligned with the fiber aperture on the housing of the OSA and set to focus on a fiber coupling plane in the housing of the OSA, and a light spot presented on the fiber coupling plane by a laser beam emitted from the functional element through the lens, in the case of TOSA, or an image of a light-emitting area (in the case of TOSA, excluding the side emitted laser) or a receiving area (in the case of ROSA) of the functional element presented on the fiber coupling plane via the lens, is used as an object to be measured in the alignment and final fixing of the functional element in the housing.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 4A:
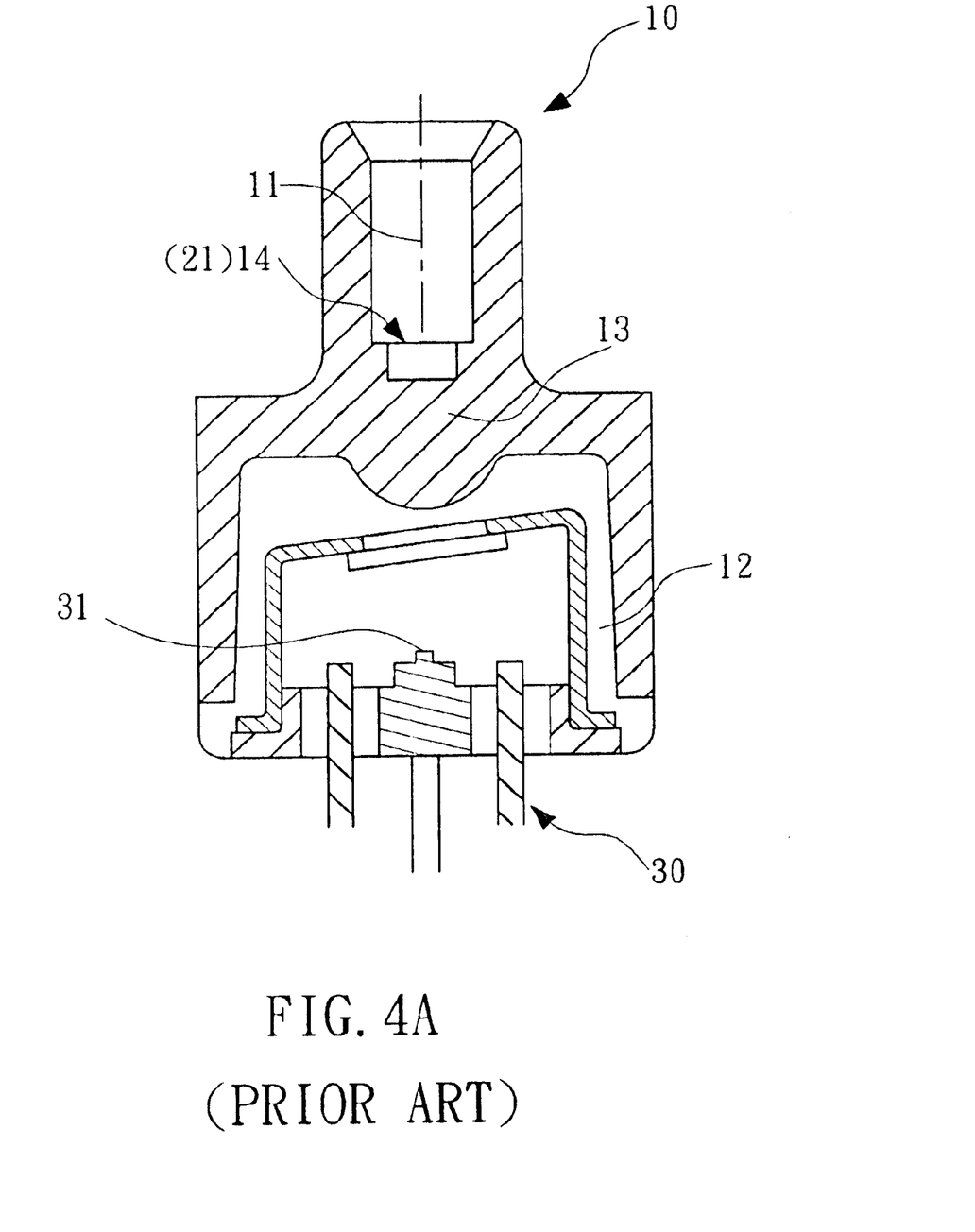
FIG. 4A is a sectional view showing the assembling of a functional element to the one-piece housing transceiver optical sub-assembly using the method of the present invention.
Figure 4B:
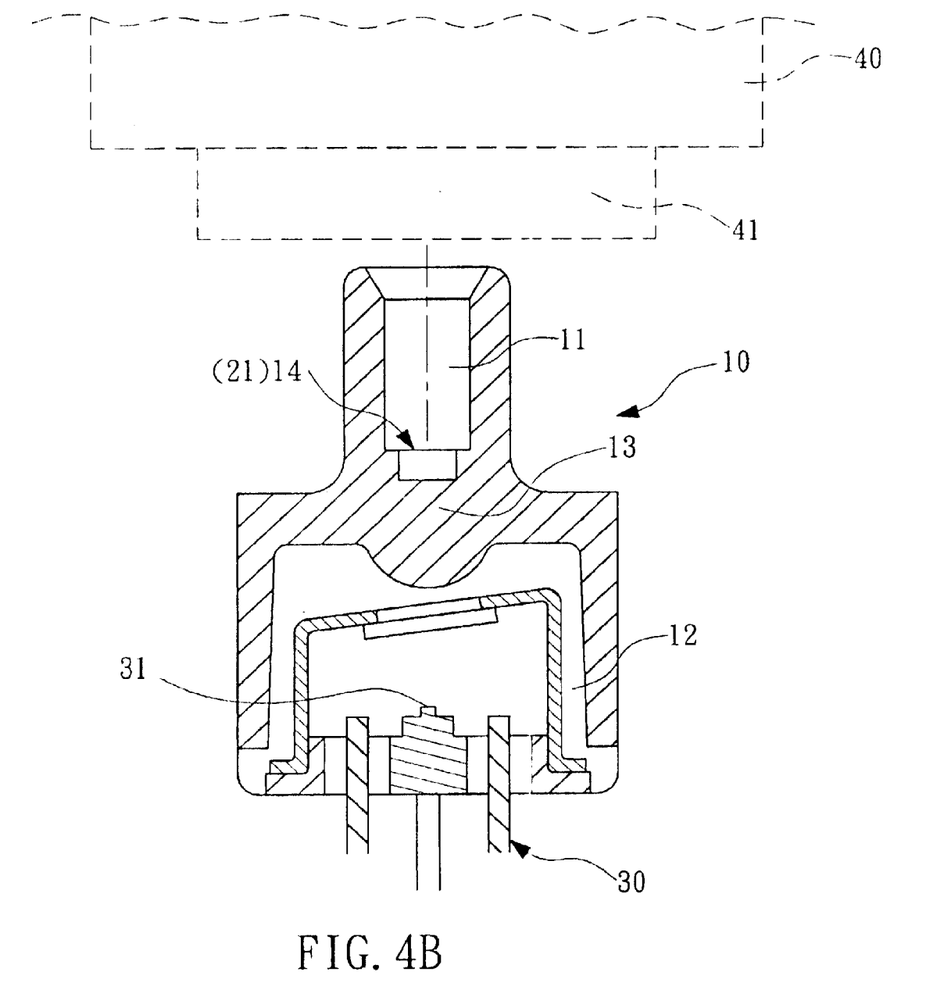
FIG. 4B shows the measuring of the one-piece housing transceiver optical sub-assembly of FIG. 4A using the method of the present invention.

In a first aspect of the present invention, there is provided a method for measuring and assembling a TOSA having a one-piece housing, as shown in FIGS. 1, 4A, and 4B. The method includes the following steps:

1. Prepare a housing 10 using a known plastic injection molding technique, as shown in FIG. 4A. The housing 10 is a one-piece structure similar to the conventional one-piece housings disclosed in, for example, U.S. Pat. No. 5,631,991; U.S. Pat. No. 6,432,733 B1; and U.S. Pat. No. 6,302,569 B1. The housing 10 is provided at a first end with a first aperture 11 for an optical fiber 20 to assemble thereto, and at a second end opposite to the first end with a second aperture 12 for a functional element 30 to assemble thereto. The functional element 30 may have differently designed assembling manners and functions, and may be, for example, a laser diode or a light emitting diode. In the case of a laser diode, the functional element 30 may be further divided into several different types, such as vertical cavity surface emitted laser diode (VCSEL) and side emitted laser diode, TO-can laser diode with cap and no-cap laser diode SMT type (bare chip laser diode), and the like. A lens 13 is provided on the housing 10 between the first and the second aperture 11, 12. The lens 13 may be integrally formed on the housing 10, such as that disclosed in U.S. Pat. No. 6,302,596 B1 (see FIG. 1), or separately formed for assembling to the housing 10, such as those disclosed in U.S. Pat. No. 5,631,991 and U.S. Pat. No. 6,432,733 B1.

2. Assemble the functional element 30 to the housing 10 by mounting the functional element 30 in the second aperture 12 at the second end of the housing 10, and use an image sensor 40 to align a sampling lens 41 thereof with the first aperture 11, at where the optical fiber 20 is to be connected to the housing 10. Then, set the focus of the sampling lens 41 to be coplanar with a fiber coupling plane 21, which is also a fiber stop face 14 at an inner end of the first aperture 11, so that a light spot presented on the fiber coupling plane 21 (or the fiber stop face 14) by a laser beam emitted from the functional element 30 through the lens 13 is measured and adjusted to precisely align the functional element 30 in the housing 10 and finally fix the functional element 30 to the housing 10 of the OSA.

Figure 5A:
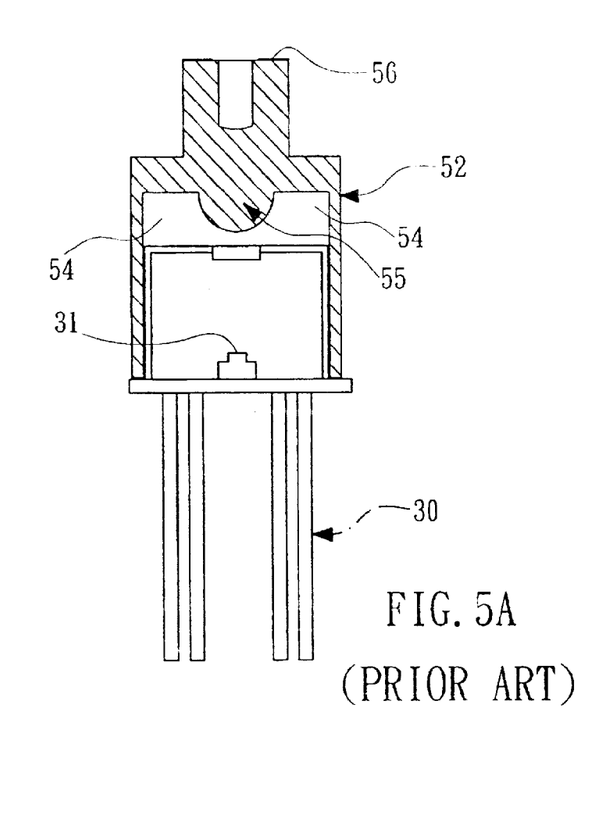
FIG. 5A is a sectional view showing the assembling of a functional element to the two-piece housing transceiver optical sub-assembly using the method of the present invention.
Figure 5B:
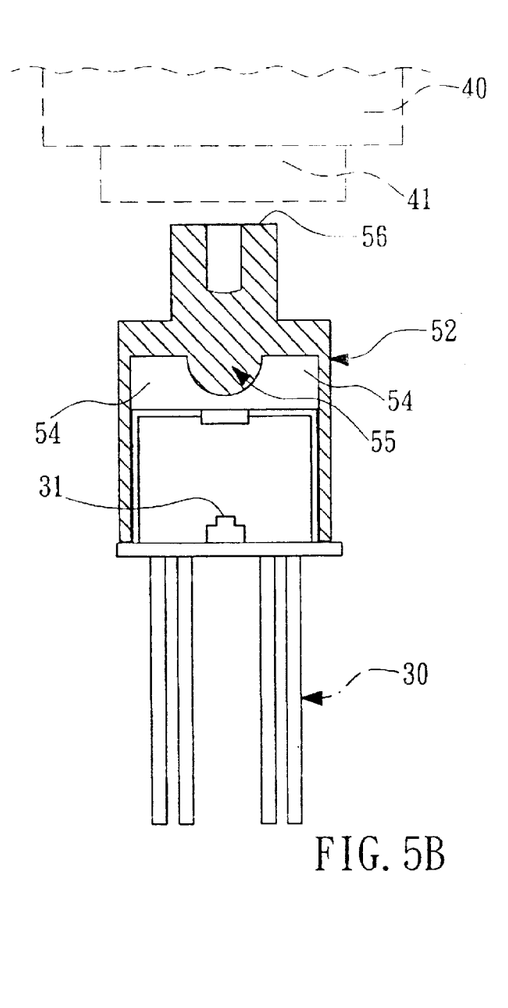
FIG. 5B shows the measuring of the two-piece housing transceiver optical sub-assembly of FIG. 5A using the method of the present invention.

In a second aspect of the present invention, there is provided a method for measuring and assembling a TOSA having a two-piece housing, as shown in FIGS. 2, 5A, and 5B. The method includes the following steps:

1. Prepare a housing 50 using a known plastic injection molding technique. The housing 50 consists of a first housing 51 and a second housing 52 axially assembled to one another, as shown in FIG. 2. The first housing 51 is provided at an outer end with a first aperture 53 for an optical fiber 20 to assemble thereto, and the second housing 52 is provided at an outer end opposite to the first aperture 53 with a second aperture 54 for a functional element 30 to assemble thereto. A lens 55 is provided on the housing 50 between the first and the second aperture 53, 54. The lens 55 may be integrally formed on the second housing 52, as those shown in FIGS. 2, 3, 5A, and 5B, or separately formed (not shown). After the first and the second housing 51, 52 are assembled together, a fiber coupling plane 21 is also a fiber stop face 56 at an inner end of the first aperture 53. The fiber stop face 56 is also a contact surface between the assembled second housing 52 and first housing 51. Since the first and the second housing 51, 52 are made using the plastic injection molding technique to have a high-precision structure, they could be easily fitly assembled together due to their precisely designed mating structure.

2. Assemble the functional element 30 to the housing 50 by mounting the functional element 30 in the second aperture 54 at the outer end of the second housing 52, as shown in FIG. 5A; and use an image sensor 40 to align a sampling lens 41 thereof with the first aperture 53, at where the optical fiber 20 is to be connected to the housing 50. Then, set a focus of the sampling lens 41 to be coplanar with the fiber coupling plane 21 or the fiber stop face 56, so that a light spot presented on the fiber coupling plane 21 (or the fiber stop face 56) by a laser beam emitted from the functional element 30 through the lens 55 is measured and adjusted to precisely align the functional element 30 in the second housing 52 and finally fix the functional element 30 to the second housing 52.

3. Assemble the first housing 51 to the second housing 52 having the functional element 30 precisely assembled thereto.

Unlike the conventional measuring method that is based on the coupling efficiency of the optical fiber connected to the OSA, the method for measuring and assembling a transceiver optical sub-assembly according to the present invention includes the use of an image sensor aligned with an aperture, to which an optical fiber is to be connected, and the setting of a focus of a sampling lens of the image sensor to co-plane with the fiber coupling plane, and the measurement and adjustment of a light spot presented on the fiber coupling plane by a laser beam from the functional element through the lens to align the functional element in the second housing.

The following are some of the advantages that may be achieved with the method of the present invention:

1. The method of the present invention for measuring and assembling the transceiver optical sub-assembly is applicable to both one-piece and two-piece housing made of a plastic material or a metal material.

2. The method effectively reduces the adverse influence of the error in the quality of the functional element or the optical fiber on the quality of the finished product of the transceiver optical sub-assembly, and thereby effectively increases the rate of good yield of the product.

3. For the purpose of the technical fields involving high-speed transmission, such as the 10G Ethernet, and multi-mode fiber or plastic optical fiber (POF), the light spot presented on the fiber coupling plane by the laser beam from the functional element may be precisely adjusted to locate at an optimal position depending on actual need, so that the distribution of fiber coupling mode may be optimized to reduce mode dispersion and to optimize the transmission bandwidth of the multi-mode fiber.

4. The method of the present invention for measuring and assembling the transceiver optical sub-assembly is applicable to different functional elements, including the vertical cavity surface emitted laser (VCSEL) and the side emitted laser, and therefore has increased applications.

Figure 6:
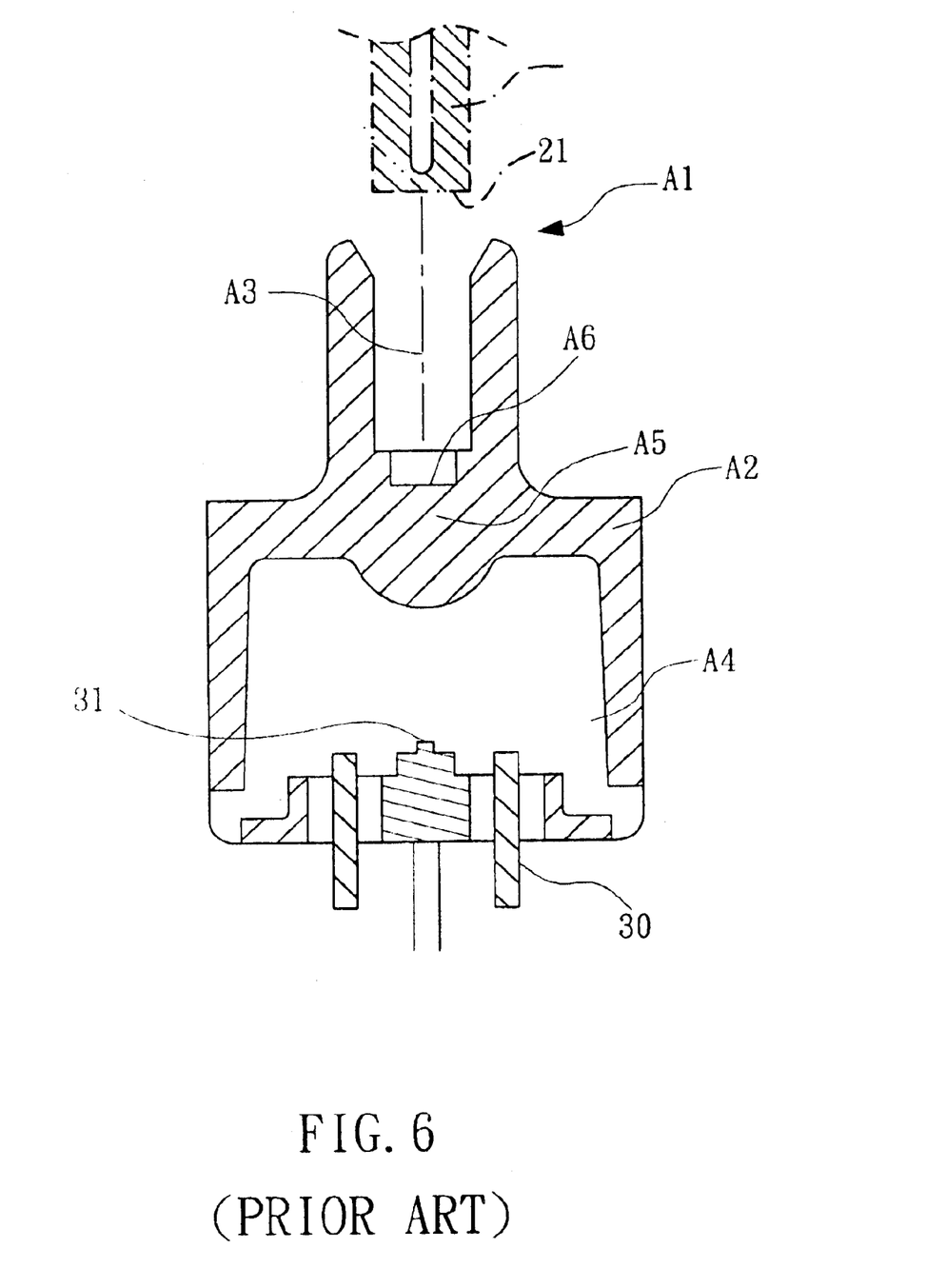
FIG. 6 is a sectional view showing a transceiver optical sub-assembly having a one-piece housing and a functional element that is a no-cap laser diode SMT type.

5. The method of the present invention for measuring and assembling the transceiver optical sub-assembly is applicable to differently formed functional elements, including flat, slant, and spherical glass lasers, and no-cap laser diode SMT type (bare chip laser diode) as shown in FIG. 6.

In a third aspect of the present invention, there is provided a method for measuring and assembling a ROSA.

Since the functional element included in a ROSA does not produce a laser beam, there would not be a light spot on the fiber coupling plane for measurement. Nevertheless, the method of the present invention may still be utilized to measure and assemble the ROSA. To do so, the image sensor or a similar instrument is used, and the focus of the sampling lens of the image sensor is set to co-plane with the fiber coupling plane in the OSA. In this case, however, an image of a receiving area of the functional element presented on the fiber coupling plane via the lens is measured and adjusted to align and assembling the functional element to the housing of the ROSA.

When a functional element in a TOSA, excluding the side emitted laser, is restricted from emitting a laser beam from a light-emitting area thereof, an image of the light-emitting area of the functional element may still be formed on the fiber coupling plane via the lens, just like the image of the receiving area of the functional element in a ROSA formed on the fiber coupling plane via the lens. Therefore, the method of the present invention for measuring and assembling a ROSA may also be applied to a TOSA. In this case, the image of the light-emitting area of the functional element in the TOSA presented on the fiber coupling plane via the lens is measured to proceed with the alignment and assembling of the functional element to the housing of the TOSA.

It is to be noted that, in the above measuring and assembling method using the measurement of the image of the receiving area of the functional element of a ROSA or the light-emitting area of the functional element of a TOSA (excluding the side emitted laser) presented on the fiber coupling plane via the lens to align the functional element in the housing, the housing may be a one-piece member as that shown in FIGS. 1, 4A, and 4B, or a two-piece member as that shown in FIGS. 2, 3, 5A, and 5B. More specifically, in the case of a one-piece housing 10 as shown in FIGS. 1, 4A, and 4b, an image of the light-emitting area 31 (in the case of TOSA) or a receiving area (in the case of ROSA) of the functional element 30 presented on the fiber coupling plane 21 via the lens 13 is measured to align the functional element 30 in the housing 10; and, in the case of a two-piece housing 50 as shown in FIGS. 2, 3, 5A, and 5B, an image of the light-emitting area 31 (in the case of TOSA) or a receiving area (in the case of ROSA) of the functional element 30 presented on the fiber coupling plane 21 (that is, the fiber stop face 56) via the lens 55 is measured to align the functional element 30 in the second housing 52. Moreover, the functional element 30 included in the ROSA or the TOSA may be designed to have different assembling manners and provide different functions. For example, the functional element 30 may be a laser diode, a light-emitting diode, or a light detector. In the case of a laser diode, the functional element may be a TO-Can laser diode with cap, or a no-cap laser diode SMT type (that is, a bare chip laser diode).

What is claimed is:

1. A method for measuring and assembling transceiver optical sub-assembly, said optical sub-assembly including an axially extended housing having an end provided with a first aperture for an optical fiber to assemble thereto and forming a fiber coupling plane, and an opposite end provided with a second aperture for a functional element to assemble thereto, and a lens provided between said first and second apertures; said method comprising the steps of:

preparing one said housing structured for forming said optical sub-assembly;

preparing a functional element adapted to assemble to said second aperture on said housing for emitting a laser beam;

preparing an image sensor or functionally similar instrument having a sampling lens provided thereon, aligning said sampling lens with said first aperture on said housing, and setting a focus of said sampling lens to be coplanar with said fiber coupling plane;

causing said functional element to emit a laser beam, allowing said emitted laser beam to pass through said lens on said housing between said first and second apertures, so that a light spot is presented on said fiber coupling plane;

measuring and adjusting size and/or position of said light spot on said fiber coupling plane in order to align said functional element in said second aperture of said housing; and fixing said aligned functional element to said housing, and completing other necessary assembling procedures to obtain said optical sub-assembly.

2. The method for measuring and assembling transceiver optical sub-assembly as claimed in claim 1, wherein said housing is a one-piece housing.

3. The method for measuring and assembling transceiver optical sub-assembly as claimed in claim 1, wherein said housing is a two-piece housing consisting of a first housing and a second housing that are axially assembled to one another; said first aperture for assembling said optical fiber being provided at an outer end of said first housing, and said second aperture for assembling said functional element being provided at an outer end of said second housing opposite to said outer end of said first housing.

4. The method for measuring and assembling transceiver optical sub-assembly as claimed in claim 1, wherein said functional element is selected from the group consisting of a laser diode and a light-emitting diode.

5. The method for measuring and assembling transceiver optical sub-assembly as claimed in claim 1, wherein said functional element is selected from the group consisting of a vertical cavity surface emitted light and a side emitted light.

6. The method for measuring and assembling transceiver optical sub-assembly as claimed in claim 2, wherein said lens is integrally formed on said housing.

7. The method for measuring and assembling transceiver optical sub-assembly as claimed in claim 2, wherein said lens is separately formed for assembling to said housing.

8. The method for measuring and assembling transceiver optical sub-assembly as claimed in claim 3, wherein said lens is integrally formed on said second housing.

9. The method for measuring and assembling transceiver optical sub-assembly as claimed in claim 3, wherein said lens is separately formed for assembling to said second housing.

10. The method for measuring and assembling transceiver optical sub-assembly as claimed in claim 1, wherein said optical fiber is selected from the group consisting of a single-mode fiber, a multi-mode fiber, and a plastic optical fiber.

11. The method for measuring and assembling transceiver optical sub-assembly as claimed in claim 1, wherein said transceiver optical sub-assembly is a transmitter assembly of a bi-directional or duplex receiver.

12. A method for measuring and assembling transceiver optical sub-assembly, said optical sub-assembly including an axially extended housing having a end provided with a first aperture for an optical fiber to assemble thereto and form a fiber coupling plane, and an opposite end provided with a second aperture for a functional element to assemble thereto, and a lens provided between said first and second apertures; said method comprising the steps of:

preparing one said housing structured for forming said optical sub-assembly;

preparing a functional element adapted to assemble to said second aperture on said housing;

preparing an image sensor or functionally similar instrument having a sampling lens provided thereon, aligning said sampling lens with said first aperture on said housing, and setting a focus of said sampling lens to be coplanar with said fiber coupling plane;

causing an image of a light-emitting area or a receiving area of said functional element to present on said fiber coupling plane via said lens on said housing between said first and second apertures;

measuring and adjusting size and/or position of said image of said light-emitting area or said receiving area on said fiber coupling plane, so as to align said functional element in said second aperture of said housing; and fixing said aligned functional element to said housing, and completing other necessary assembling procedures to obtain said optical sub-assembly.

13. The method for measuring and assembling transceiver optical sub-assembly as claimed in claim 12, wherein said housing is a one-piece housing.

14. The method for measuring and assembling transceiver optical sub-assembly as claimed in claim 12, wherein said housing is a two-piece housing consisting of a first housing and a second housing that are axially assembled to one another; said first aperture for assembling said optical fiber being provided at an outer end of said first housing, and said second aperture for assembling said functional element being provided at an outer end of said second housing opposite to said outer end of said first housing.

15. The method for measuring and assembling transceiver optical sub-assembly as claimed in claim 12, wherein said functional element is selected from the group consisting of a laser, a light-emitting diode, and a light detector.

16. The method for measuring and assembling transceiver optical sub-assembly as claimed in claim 13, wherein said lens is integrally formed on said housing.

17. The method for measuring and assembling transceiver optical sub-assembly as claimed in claim 13, wherein said lens is separately formed for assembling to said housing.

18. The method for measuring and assembling transceiver optical sub-assembly as claimed in claim 14, wherein said lens is integrally formed on said second housing.

19. The method for measuring and assembling transceiver optical sub-assembly as claimed in claim 14, wherein said lens is separately formed for assembling to said second housing.

20. The method for measuring and assembling transceiver optical sub-assembly as claimed in claim 12, wherein said transceiver optical sub-assembly is selected from the group consisting of simplex, unidirectional, duplex, and bi-directional optical sub-assemblies.

21. The method for measuring and assembling transceiver optical sub-assembly as claimed in claim 12, wherein said optical fiber is selected from the group consisting of a single-mode fiber, a multi-mode fiber, and a plastic optical fiber.

* * * * *